United States Patent [19]

Takemoto

[11] 4,017,896
[45] Apr. 12, 1977

[54] REVERSING CASSETTE TAPE MACHINE
[76] Inventor: Shigeji Takemoto, 8-7, Gakuen Asahimachi, Nara, Japan
[22] Filed: June 17, 1975
[21] Appl. No.: 587,614
[30] Foreign Application Priority Data

| July 19, 1974 | Japan | 49-83394 |
| July 19, 1974 | Japan | 49-83395 |
| July 19, 1974 | Japan | 49-83396 |
| July 19, 1974 | Japan | 49-83397 |
| July 19, 1974 | Japan | 49-83398 |

[52] U.S. Cl. ............................. 360/74; 242/198; 360/96
[51] Int. Cl.² ............... G11B 15/06; G11B 15/29; G11B 23/04
[58] Field of Search ........... 360/74, 71, 75, 105, 360/93, 96; 242/199, 201, 186, 197; 226/49-51

[56] References Cited
UNITED STATES PATENTS

| 3,632,897 | 1/1972 | Ban | 360/71 |
| 3,697,015 | 10/1972 | Iwata | 360/74 |
| 3,810,237 | 5/1974 | Nozawa | 360/74 |
| 3,843,966 | 10/1974 | Munakata | 360/74 |
| 3,870,248 | 3/1975 | Nara et al. | 360/74 |
| 3,932,890 | 1/1976 | Ueki et al. | 360/74 |
| 3,936,877 | 2/1976 | Maruyama | 360/74 |

Primary Examiner—Alfred H. Eddleman
Attorney, Agent, or Firm—George H. Mitchell, Jr.

[57] ABSTRACT

The present invention relates to a tape recorder. The tape recorder comprises a pair of reel shafts which accomodate both winding and rewinding reels for a magnetic tape; a pair of capstan shafts each of which rotates in an opposite direction and transfers said magnetic tape in that direction; an idle roller for appropriately rotating each of said reel shafts in two different winding directions of the magnetic tape; a driving motor which is linked and cooperated both with flywheels pivoted on each of said capstan shafts and with said idle roller; an electromagnetic relay cooperated with a sensor which senses the end of said magnetic tape; a contact plate which is shifted by said electromagnetic relay to the rotating position of a contact pin pivoted on the fly-wheel of one of said capstan shafts, and which is moved by said pin; a change-over plate which alternately contacts and detaches said idle roller with and from each of said reel shafts so as to let each reel shaft operate the tape-winding movement appropriately; a link plate for linking cooperatively said contact plate and change-over plate.

7 Claims, 21 Drawing Figures

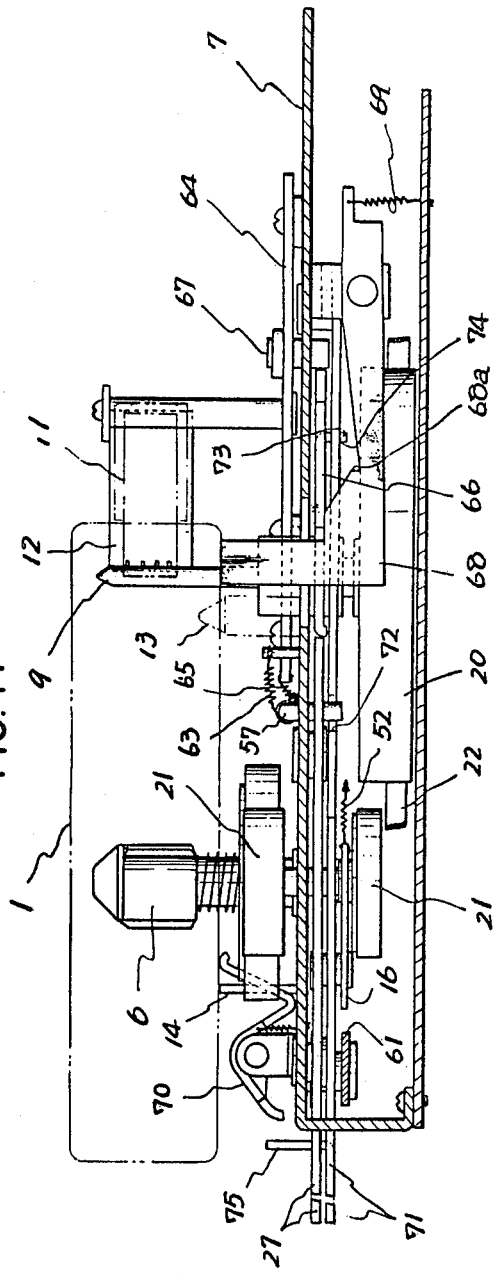
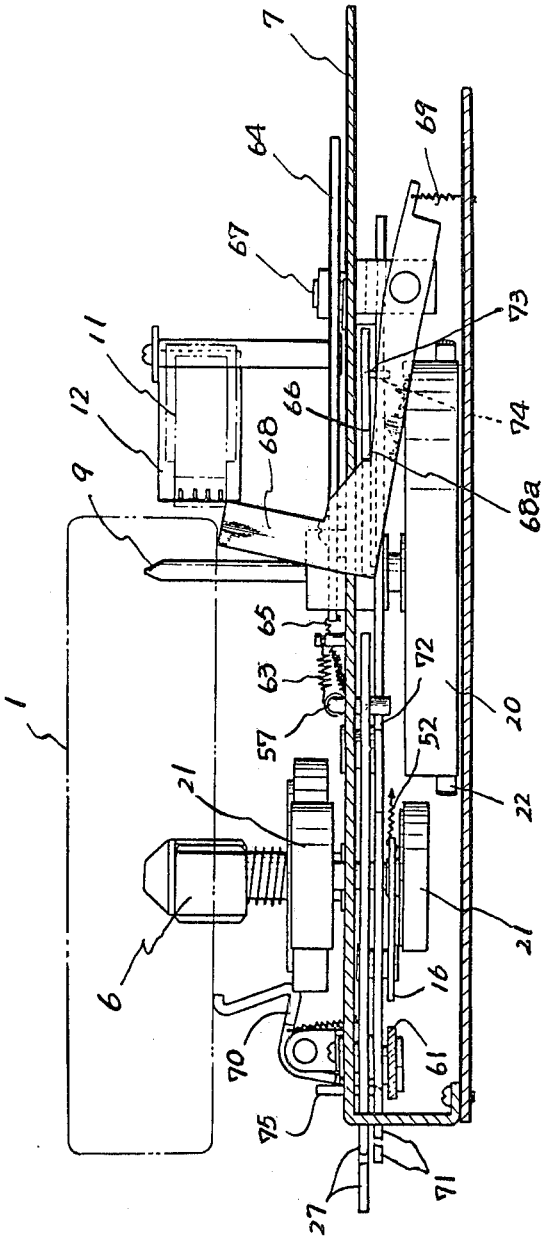

REVERSING CASSETTE TAPE MACHINE

The present invention relates to a reciprocating and reproducing tape recorder which accomodates a cassette containing both a pair of reels and a magnetic tape with definite ends that wind between said reels, and which forwards said magnetic tape in the positive or reverse direction so as to reproduce said tape.

The first object of the present invention is to provide a tape recorder wherein the fast-forwarding of said magnetic tape in the positive or reverse direction is correctly manipulated and whose structure is compact, so as to make the recorder well in order and inexpensive.

Another object of the present invention is to provide a tape recording wherein the fast-forwarding operation of said magnetic tape is released by surplus energy of the capstan shafts so as to curtail energy and make the recorder economical and reasonable.

Still another object of the present invention is to provide a tape recorder wherein the releasing of forwarding the magnetic tape at a uniform speed and at a rapid speed and ejecting the cassette are operated sequentially and in order by a stopping lever, so as to simplify each operation dispensing with improper operation and make it accurate.

Other objects and advantages of the present invention will appear from the following detailed description and by reference to the accompanying drawings wherein:

FIG. I is a general plan view of one embodiment of the present invention;

FIG. 14 is an enlarged sectional side view of the FIG. 13;

FIG. 17 is an enlarged sectional side view illustrating the operation as indicated in FIG. 14;

Figure 3:
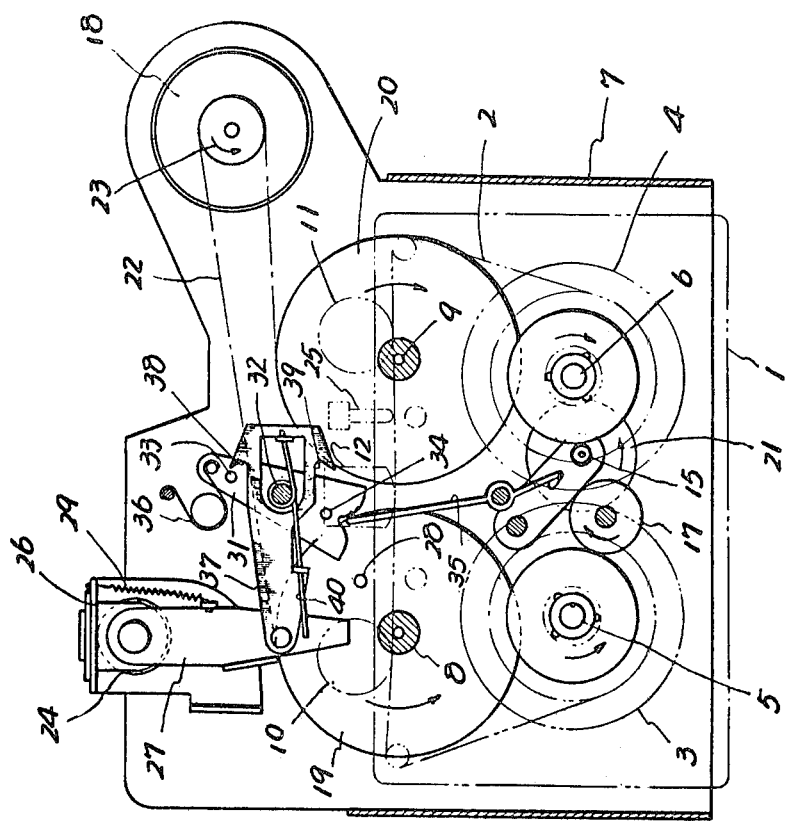
FIG. 3 and FIG. 4 are general plan views illustrating the operation as indicated in FIG. I.
Figure 1:
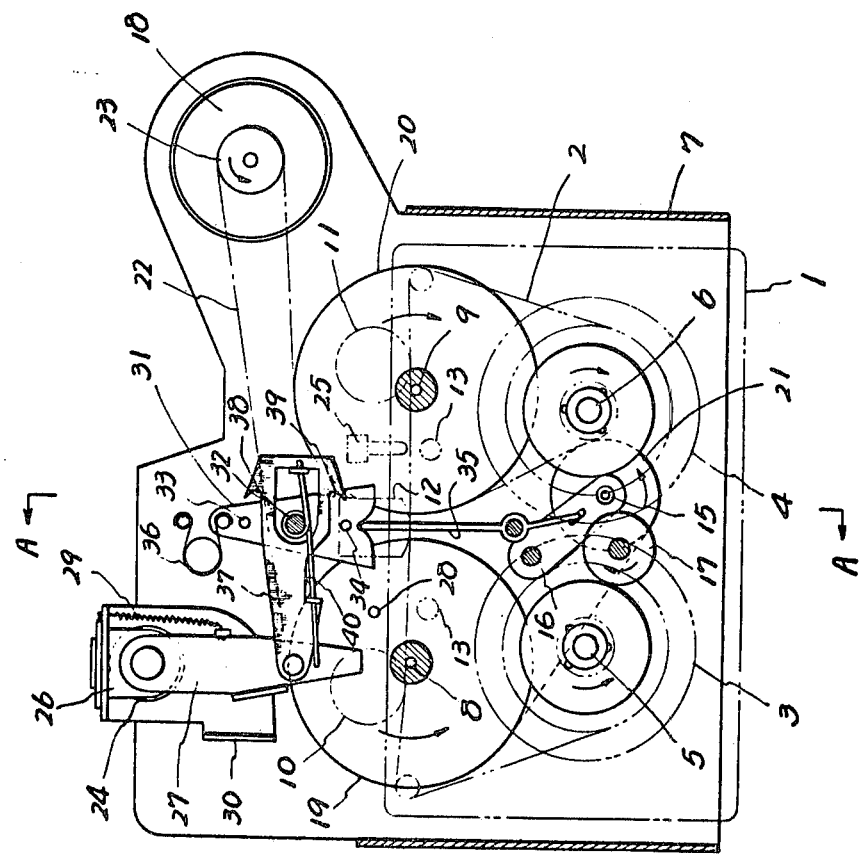
Figure 2:
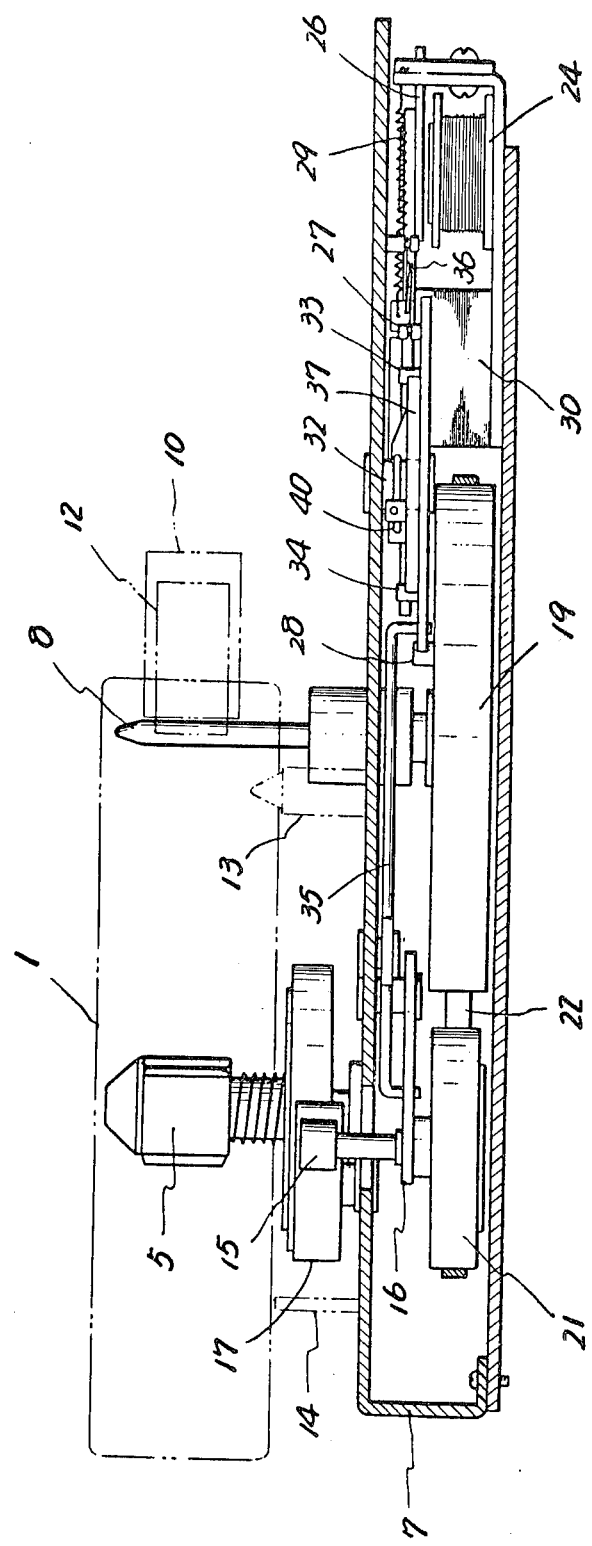
FIG. 2 is a sectional view taken on line A — A in FIG. I.

Designated 1 is a cassette containing a magnetic tape of 4 tracks and 2 channels 2 and a pair of reels 3, 4 for winding and rewinding said tape (2). Designated 5, 6 are a pair of reel shafts which are pivoted on a chassis 7 that accommodates said cassette 1, and which contact and accommodate each of the reels (3) (4). Designated 8, 9 are a pair of capstan shafts for forwarding in the positive and reverse direction the magnetic tape 2 together with a pair of pinch rolls 10, 11 contacted with each other. Designated 12 is a multi-lined magnetic head which is attached to a base plate 41 slidably formed on said chassis 7 and which is also contacted with the magnetic tape 2 that is forwarded in the positive and reverse direction by each of said capstan shafts 8, 9; so as to reciprocate and reproduce said tape 2. Designated 13, 14 are guide poles for supporting said cassette 1 on the settled position above the chassis 7. Designated 15 is an idle roller which is pivoted on one end of a swinging supporting plate 16 whose other end is pivotally fixed to the chassis 7, and also which is alternately contacted both with a reverse roll 17 cooperating with one reel shaft 5 and with the other shaft (6), so as to rotate each of the reels 5, 6 in the winding direction of the magnetic tape 2. Designated 18 is a driving motor which is linked by an endless belt 22 and an output pulley 23 both with a pair of fly-wheels 19, 20 formed on the same shaft as that of the capstan shafts 8, 9 and with a link pulley 21 formed on the same shaft as that of said idle roller 15.

One capstan shaft 8 and the idle roller 15 are rotated in a counter-clockwise direction and the other capstan shaft 9 in a clockwise direction respectively through said motor 18; one reel shaft 5 is rotated in a counter-clockwise direction and the other reel shaft 6 in a clockwise direction alternately through said idle roller 15; each of the pinch rolls 10, 11 is alternately contacted with and detached from each of the capstan shafts 8, 9, and the magnetic tape (2) is transferred in the positive and reverse direction and reciprocated and reproduced.

Designated 24 is an electromagnetic relay which cooperates with a sensor that senses the end of said magnetic tape 2, and which is excited when the transfer of said tape 2 has been completed. Designated 26 is a flexible plate. Designated 27 is a contact plate one end of which is pivoted on said flexible plate 26 and the other end of which is extended to the path of rotating position of a contact pin 28 projected on the surface of one fly-wheel 19. Designated 29 is a compressing spring for normally keeping said plate 27 out of the path of the contact pin 28. Designated 30 is a flexible plate, i.e., a yoke of the electromagnetic relay 24 that is in the position wherein the plate 21 is swingingly rotated when in contact with said pin 28. The end of the magnetic tape 2 is sensed through said sensor 25; at the same time contact plate 27 is transferred by excitation of the electromagnetic relay 24 and said plate 27 is swingingly rotated through the contact pin (28); and said plate 27 keeps on being absorbed with the flexible plate 30 until excitation of the electromagnetic relay 24 is released.

Figure 4:
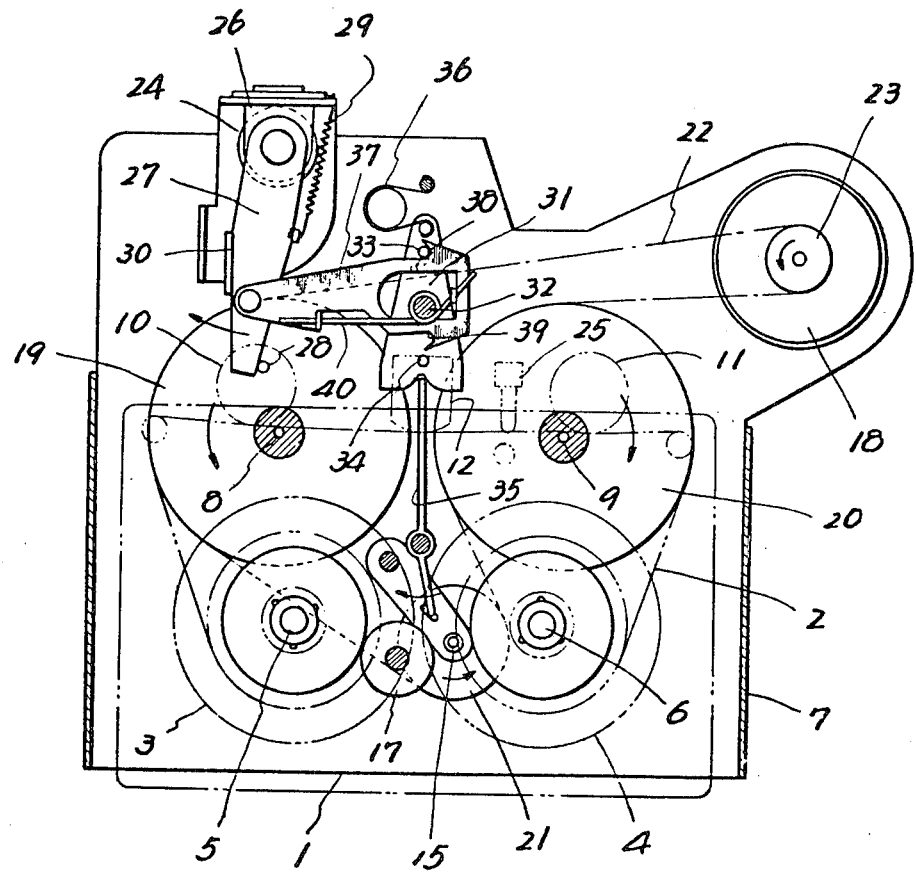

Further designated 31 is a change-over plate the middle of which is slidably pivoted on the chassis 7 through a supporting shaft 32 and also on the surface of both ends of which are projected a pair of engaging pins 33, 34. Designated 35 is a cooperative lever the middle of which is pivoted on the chassis 7 and also both ends of which are engaged with the supporting plate 16 of the idle roller 15 and the changeover plate 31 respectively. Designated 26 is a scissors-shaped spring which swings and keeps said change-over plate 31 in either one of the directions and contacts with the idle roller 15 with the reel shaft 6 or with the reverse roll 17. Designated 37 is a link plate one end of which is pivotally fixed on the middle of said contact plate 27 and the other end of which is extended between the engaging pins 33, 34, outside that extended portion being formed engaging hooks 38, 39 so as to be engaged with each of the pins 33, 34 respectively. Designated 40 is a controlling spring both ends of which are engaged with both said change-over plate 31 and said link plate 37 and the middle of which is wound around the supporting shaft 32 so as to keep the engaging hooks 38, 39 in the neutral position away from each of the engaging pins 33, 34. When the contact plate 27 is swingingly rotated by the contact pin 28 of said fly-wheel 19, one engaging pin 33 and one engaging hook 38 placed close to each other, as is indicated in FIG. 3 and FIG. 4, are engaged and moved; also the other engaging pin 34 and the other engaging hook 39 separated from each other are at different levels crossed and moved; the change-over plate 31 is swingingly changed at each reciprocation of the link plate 37 which is reciprocated by said contact plate 27, and the change of the idle roller 15 to the reel shaft 6 and the reverse roll 17 is operated alternately.

Further as is indicated in FIGS. from 5 to 8, designated 42, 43 are supporting plates on one end of which are pivoted the pinch rolls 10, 11 respectively and the centers of which are pivoted on a magnetic head base plate 41 by shafts; and other ends of which are contacted with a pressing pin 44 formed on the same shaft as that of said engaging pin 34. Designated 45, 46 are compressing springs which energize said plates 42, 43 so as to contact each end of the plates 42, 43 with the pressing pin 44 respectively and to pull each of the pinch rolls 10, 11 toward each of the capstan shafts 8, 9. Thus the winding direction of the magnetic tape which is wound by each of said reel shafts 5, 6 and the forwarding direction of the magnetic tape which is forwarded at a uniform speed by each of said capstan shafts 8, 9 and the pinch rolls 10, 11 — these two directions are changed cooperatively.

Also as is indicated in FIGS. from 9 to 12, designated 47, 48 are a pair of fast-forwarding rolls which are appropriately contacted with each of said fly-wheels 19, 20 and each of said reel shafts 5, 6 so as to convey the rotation power of each of the fly-wheels 19, 20 to each of the reel shafts 5, 6 respectively. Designated 49, 50 are a pair of fast-forwarding levers which pivot each of said rolls 47, 48; and which pivotally fix swinging plates 53, 54 energized by springs 51, 52 that pull each of said rolls 47, 48 toward each of the reel shafts 5, 6 and each of the fly-wheels 19, 20; and also which contact and detach each of the rolls 19, 20 with and from each of the corresponding fly-wheels and each of the corresponding reels 5, 6. Designated 55, 56 are restoring springs for restoring the movement of each of the levers 49, 50. Thus through said motor 18 one fly-wheel 19 and the idle roller 15 are rotated in a counter-clockwise direction and the other fly-wheel 20 in the clockwise direction respectively; when the magnetic tape 2 is transferred (for reproduction) at a uniform speed, each of the pinch rolls 10, 11 is contacted with each of the capstan shafts 8, 9 alternately and each of the reels 5, 6 is rotated in a counter-clockwise direction or a clockwise direction alternately through the idle roller 15; and also when the magnetic tape 2 is fast-forwarding rolls 47, 48 is contacted through each of the fast-forwarding levers 49, 50 with each of the fly-wheels 19, 20 and each of the reel shafts 5, 6 alternately so as to rotate at a rapid speed each of the reel shafts 5, 6 in a counter-clockwise or a clockwise direction alternately.

Further designated 57 is a lock arm which is slidably formed on the chassis 7 at a right angle to each of the fast-forwarding levers 49, 50; and both ends of which are extended to the position where they are contacted with expanded heads 49a, 50a made by bending each end of the levers 49, 50 in a reversed U shape and thereby which keeps each of the fast-forwarding levers 49, 50 in an operating condition. Designated 58 is a restoring plate one end of which is extended to the rotating path of a pin 59 projected on one swinging end portion of said plate 27; the other end of which is linked with one end of said lock arm 57, the middle of which is pivoted on the chassis, and thereby when engaged with said plate 27 releases the holding of the fast-forwarding levers 49, 50 whose operation is kept by the lock arm 57. Designated 60 is a compressing spring which energizes the restoring plate 58 so as to engage said lock arm 57 with each of the fast-forwarding levers 49, 50. Designated 61 is a wrong manipulation-preventing plate, the middle of which is supported by a shaft 62; both ends of which are extended to the sliding position of shoulders 49b, 50b formed on each side of said fast-forwarding levers 49, 50 alternatively. Thus when either one of the fast-forwarding levers 49, 50 is operated and the magnetic tape 2 is wound rapidly, the winding movement is released at the same time when it is over.

In FIGS. from 13 to 17 is shown the following embodiment. Designated 63 is a compressing spring which energizes said lock arm 57 so as to engage said arm 57 with each of the fast-forwarding levers 49, 50. Designated 64 is a sliding plate which accommodates both said pinch rolls 10, 11 and said magnetic head 12 and which is slidably mounted on the chassis 7. Designated 65 is a compressing spring which pulls said plate 64 in the accommodating direction of the cassette 1 formed on the chassis 7. Designated 66 is a playing plate the middle of which is contacted with a supporting shaft 67 projected on said plate 64; both ends of which are contacted with each end of the fast-forwarding levers 49, 50; thereby which cooperates with each of the levers 49, 50 and detaches the sliding plate 64 from the cassette 1. Designated 68 is a hook plate one end of which is extended to the accommodating position of the cassette 1 formed on the chassis 7; which possesses a step portion for engaging and keeping said playing plate 66 at the time of its operation; and thereby which cooperates with the contact and detachment of said cassette 1 and controls the operation of the playing plate 66. Designated 69 is a compressing spring which energizes said hook plate 68 and keeps the engagement of its step portion 68a with the playing plate 66. Designated 70 is an ejecting arm for detaching said cassette 1 from its established position on the chassis 7. Designated 71 is a stopping lever which possesses a first step portion 72 that when contacted with one end of said lock arm 57, released the holding of the fast-forwarding levers 49, 50 whose operation is kept by said arm 57; it also possesses a second step portion 74 that, when contacted with a tongue 73 formed on said playing plate 66, operates said plate 66 and restores the movement of the sliding plate 64; and lever 71 also possesses a third step portion 75 that, when contacted with said ejecting arm 70, operates said arm 70. Thus the releasing of the fast-forwarding levers 49, 50 whose operation is kept by said lock arm 57, the restoring of the movement of the slinding plate 64 that is restored by said playing plate 66, the ejecting of the cassette 1 that is ejected by said ejecting arm 70 — these operations are all manipulated, step by step in order, by the stopping lever 71.

In FIGS. from 18 to 21, the following embodiment is shown. Designated 76 is an accommodating case which accommodates said cassette 1 and which slidably inserts pins 77 and 78, formed on both sides of the case 76 into vertical slots 79 and 80, formed on the vertical portion of the chassis 7. Designated 81, 82 are compressing springs which energize the pins 77, 78 of said accommodating case 76 so as to move the case 76 downward. Designated 70 is an ejecting arm, the middle of which is pivoted on the chassis 7 and one end of which is extended to below the pin 77 of the accommodating case 76, so as to raise the case 76 against said spring 81, 82. Designated 84 is an ejection-controlling plate which is slidably attached to the bottom surface of said accommodating case 76; one end of which is extended to within the case 76 so as to contact with the cassette 1 contained within said case 76; and which possesses a guide plate 86 that is contacted with a pin 85 projected on the chassis. Designated 87 is a compressing spring which restores the movement of said plate 84 so as to detach the cassette 1 from the case 76. Designated 68 is a hook plate which is extended to below said accommodating case 76 so as to contact with said case 76; which possesses a shoulder 68a engaged with said playing plate 66; and which through said plate 66 detaches the sliding plate 64 from the accommodating case 76 and holds it. Designated 69 is a compressing spring which energizes said hook plate 68 and keeps the engagement of its shoulder 68a with the playing plate. Designated 71 is a stopping lever which possesses a second shoulder 74 that contacts with a tongue 73 formed on said playing plate 66 and operates said plate 66 and also restores the movement of the slinding plate 64; it also possesses a third shoulder 75 that contacts with said ejecting arm 70 and operates said arm 70. Thus the ejection-controlling plate 84 is operated by the cassette 1 accommodated in said accommodating case 76, the engagement of said plate 84 with the pin 85 is released and the case 76 is moved downward by the springs 81, 82; also the restoring operation of the sliding plate 64 and the upward-movement operation of the case 76 are performed by the stopping lever 71.

The following embodiment is shown in FIG. 3. When the cassette 1 is accommodated in a playing condition and the pinch roll 11 is contacted with the capstan shaft 9 and also the reel shaft 6 is rotated through the idle roller 15 in a clockwise direction, then the magnetic tape is transferred in the right hand direction at a uniform speed by said capstan shaft 9 and the pinch roll 11, and the magnetic tape 2 is wound round the reel 4 which is contacted with and accommodated in the reel shaft 6. Thus music and the like are reproduced through the magnetic head 12 contacted with said tape 2. Then, when the winding of the magnetic tape 2 round said reel 4 is over, the end of said tape 2 is sensed by the sensor 25, and the electromagnetic relay 24 is excited, the contact plate 27 is moved down on the surface of the fly-wheel 19 against the spring 29, and then the plate 27 is swung by the contact pin 28. And the following embodiment is shown in FIG. 4. When the link plate 37 is slidingly transferred by said plate 27, one engaging pin 33 and the engaging hook 38 contact each other, the change-over plate 31 is rotated in a counter-clockwise direction and also said plate 31 is somewhat pulled toward the engaging pin 33 against the controlling spring 40; therefore the other engaging pin 34 and the engaging hook 39 separated from each other are crossed and moved at different levels, said plate 31 is slidingly changed, the idle roller 15 is contacted with the reverse roll 17 through the cooperative lever 35; at the same time the pinch roll 10 is pressed on the capstan shaft 8, the reel shaft 5 is rotated in a counter-clockwise direction, the magnetic tape 2 is wound round the reel 3; and also the magnetic tape 2 is transferred to the left hand direction at a uniform speed by the capstan shaft 8 and the pinch roll 10 and said tape 2 is reproduced through the magnetic head 12.

Figure 7:
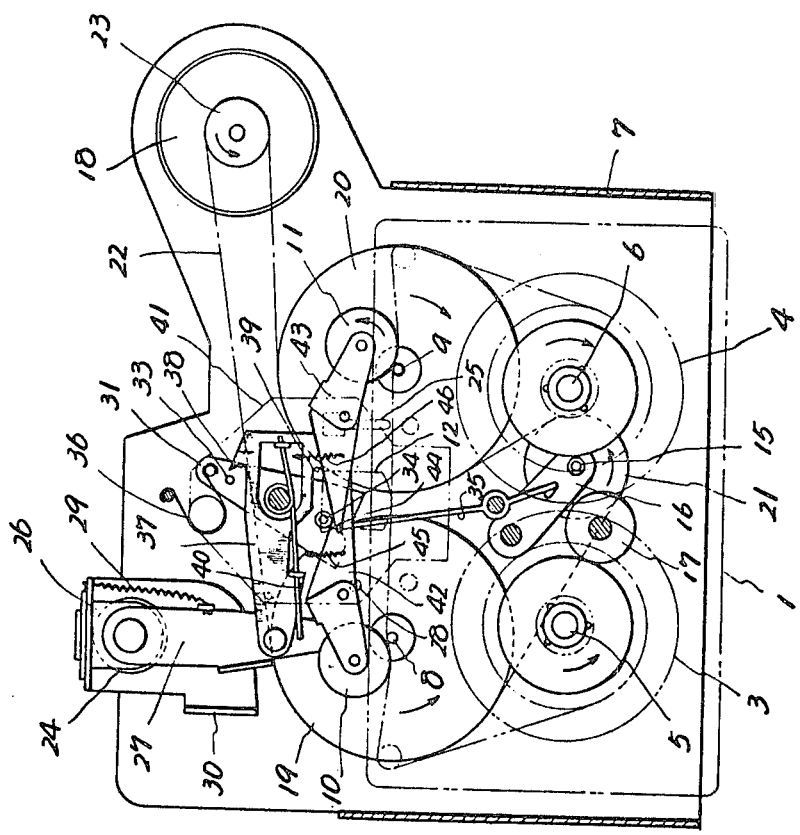
FIG. 7 and FIG. 8 are general plan views illustrating the operation as indicated in FIG. 5.
Figure 5:
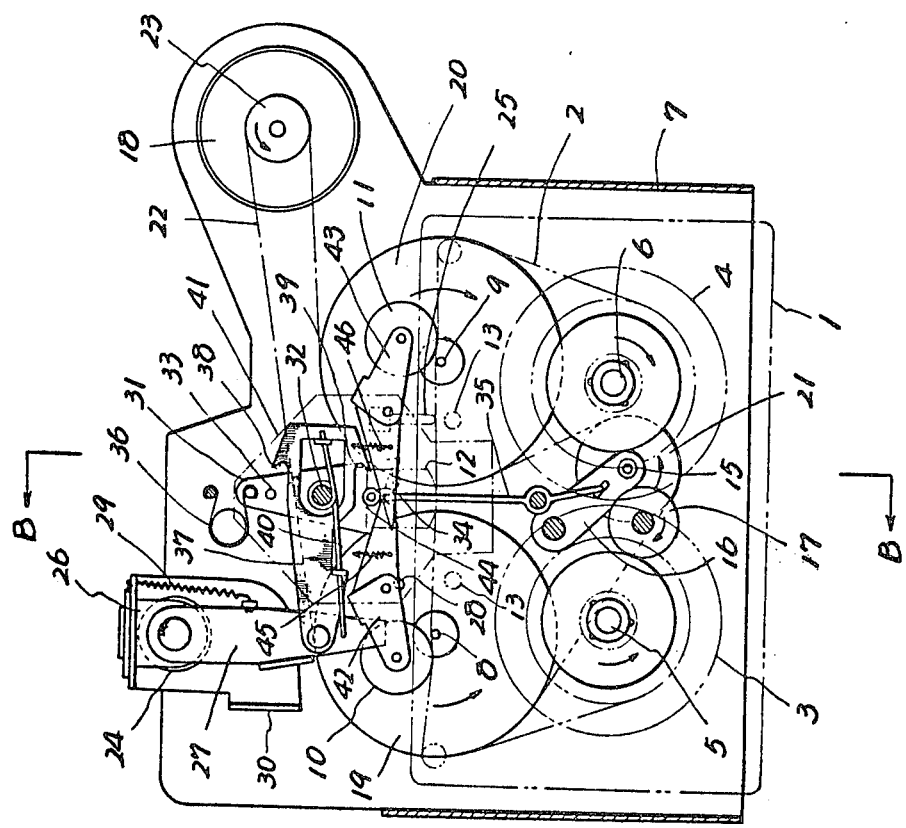
FIG. 5 is a general plan view.
Figure 6:
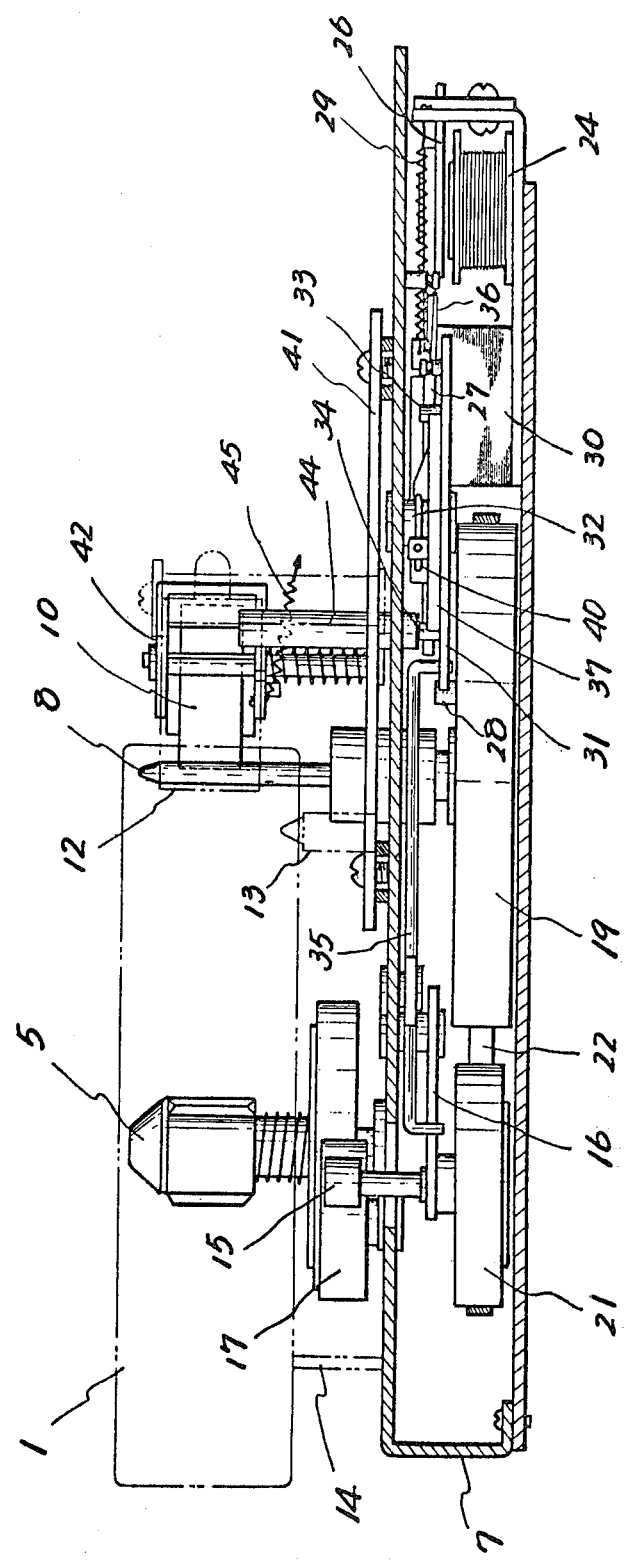
FIG. 6 is a sectional view taken on line B — B in FIG. 5.
Figure 8:
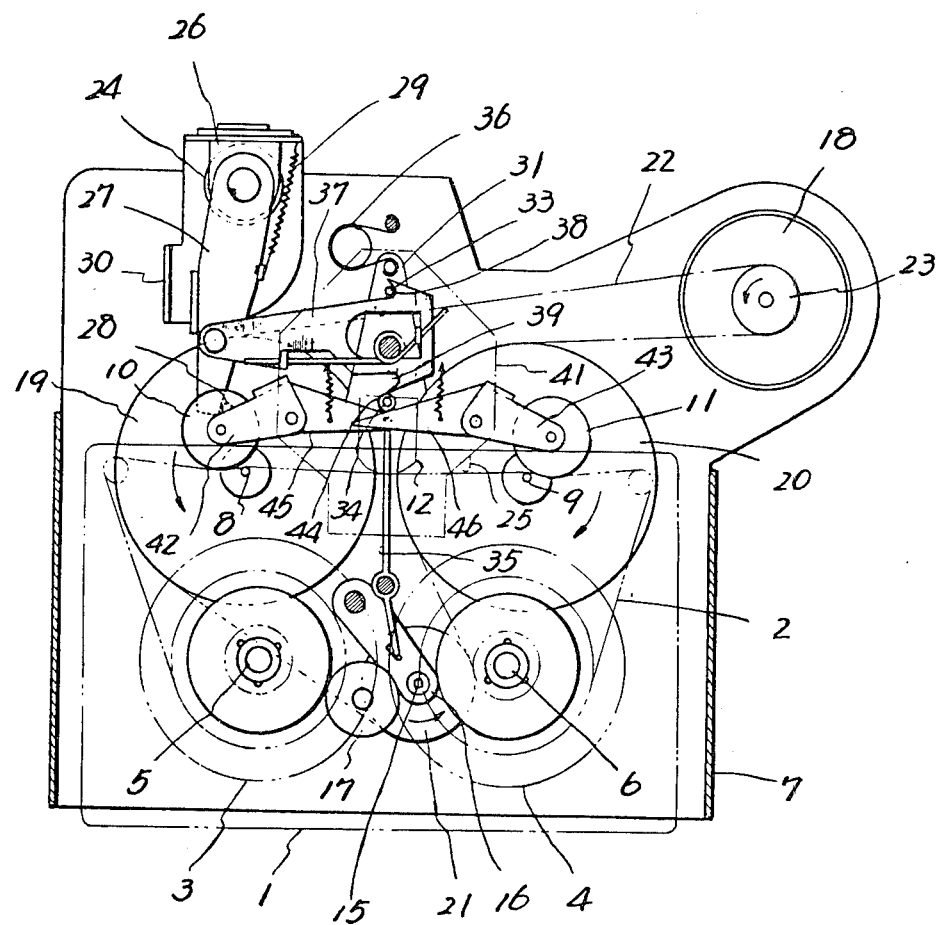
Figure 9:
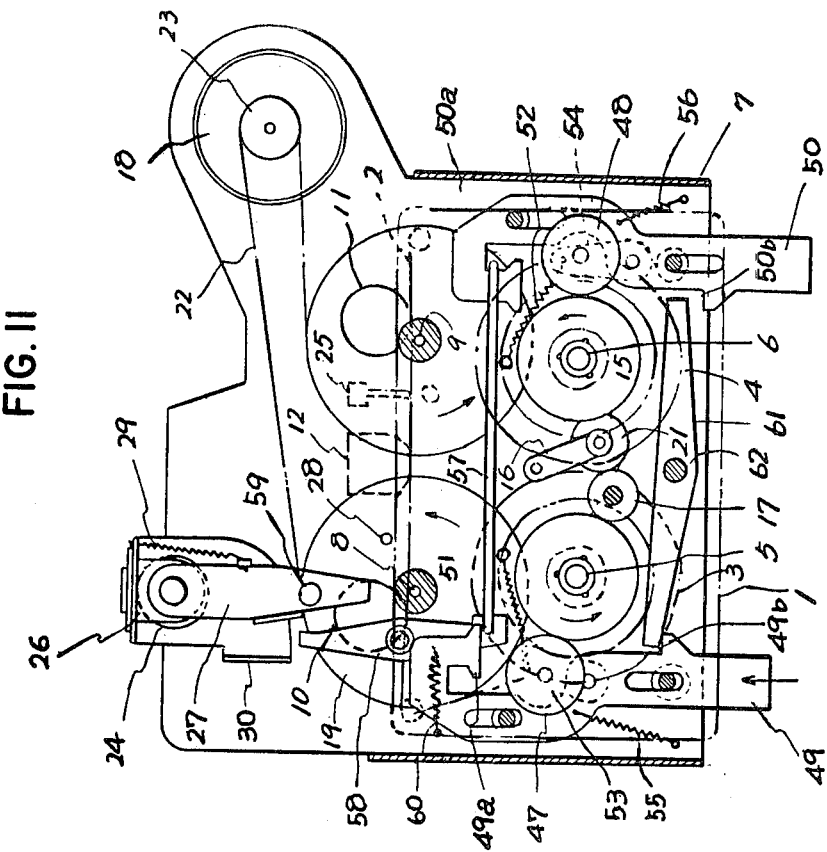
FIG. 9 is a general plan view.
Figure 11:
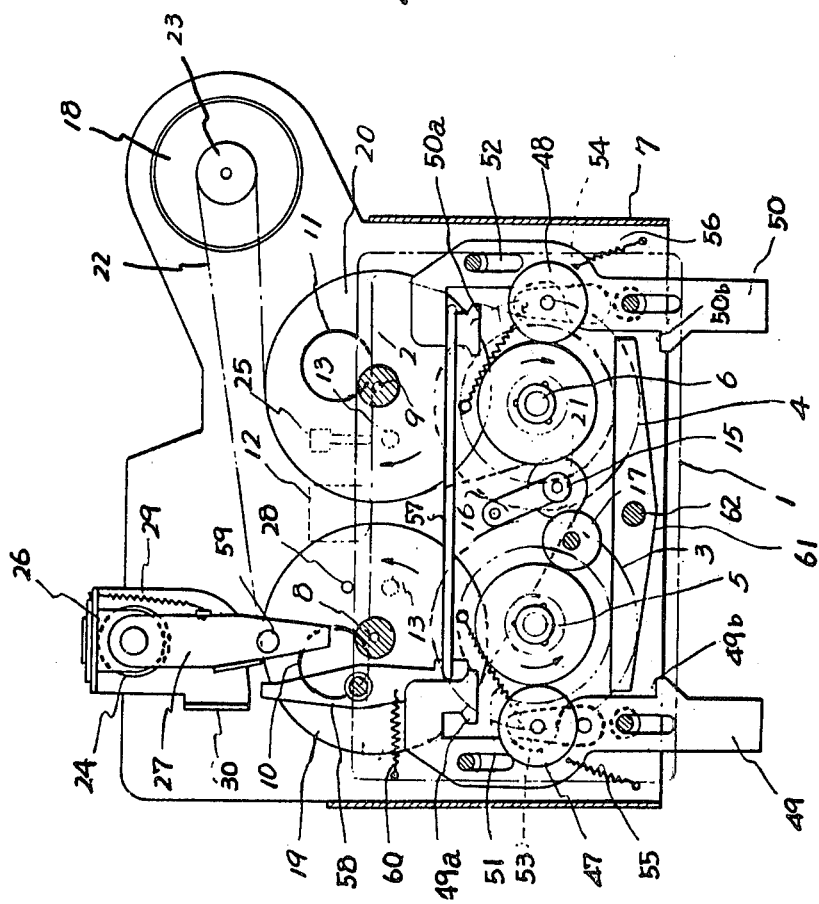
FIG. 11 and FIG. 12 are general plan views illustrating the operation as indicated in FIG. 9.
Figure 10:
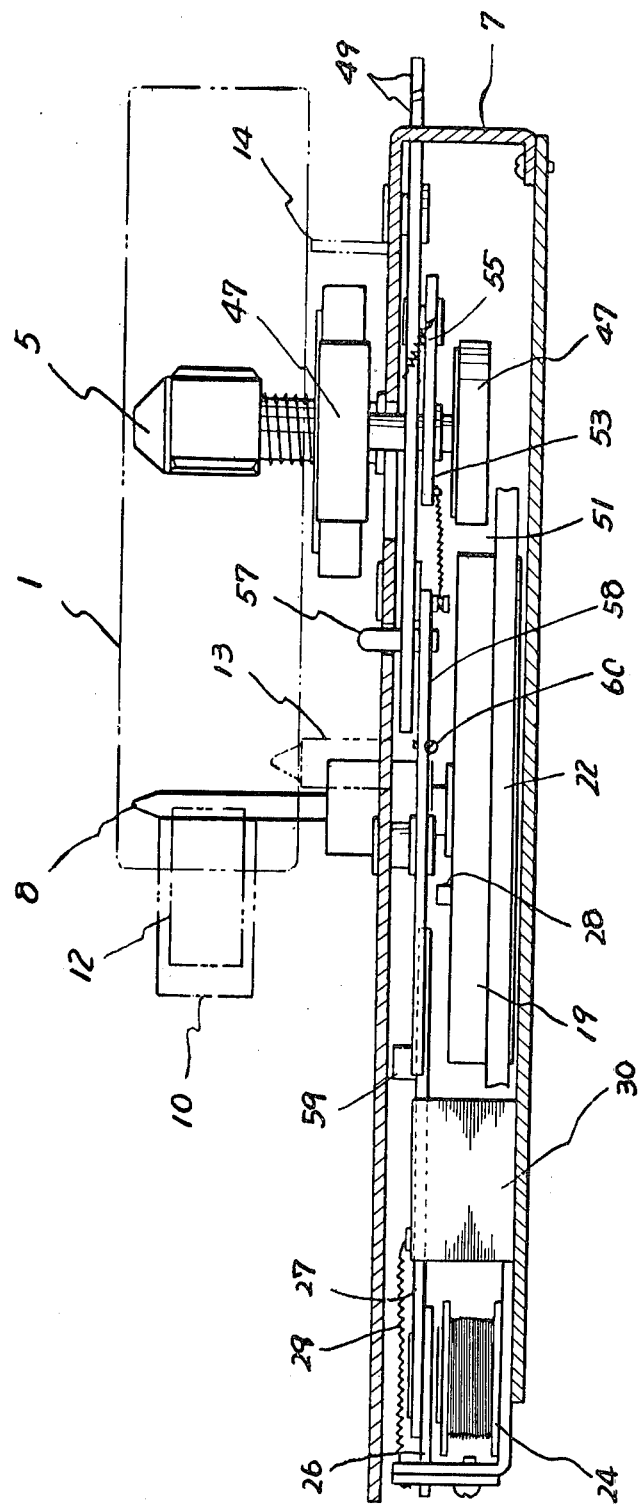
FIG. 10 is an enlarged sectional side view of FIG. 9.

Also, when said contact plate 27 is swung by the contact pin 28, said plate 27 is absorbed with the flexible plate 30 and kept in that condition; and as is mentioned above, when excitation of the electromagnetic relay 24 is released by the sensor 25 after the reverse forwarding of the magnetic tape 2, the contact plate 27 is swingingly moved upward by the spring 29 and the movement of the link plate is restored. Thus by changing the transferring direction of said magnetic tape 2 and transferring the tape 2 in the positive and reverse direction, each channel of said tape 2 of 4 tracks and 2 channels is reproduced through the magnetic head 12 alternately and continually. Furthermore, the following embodiment is shown in FIG. 7. When the cassette 1 is accommodated in a playing condition and the pinch roll 11 is contacted with the capstan shaft 9 through the spring 46 and also the reel shaft 6 is rotated in a clockwise direction through the idle roller 15, then the magnetic tape 2 is transferred in the right hand direction at a uniform speed by said capstan shaft 9 and said pinch roll 11, the magnetic tape 2 is wound round the reel 4 which is contacted with and accommodated in the reel shaft 6, and music and the like are reproduced through the magnetic head 12 which is contacted with said tape. After this, when the winding of the magnetic tape 2 round said reel 4 is over, the end of said tape 2 is sensed by the sensor 25, the electromagnetic relay 24 is excited, the contact plate 27 is moved down on the surface of the fly-wheel 19 against the spring 29, and the plate 27 is swung by the contact pin 28. Also the following embodiment is shown in FIG. 8. When the link plate 37 is slidingly transferred by said plate 27, the link plate 37 is slidingly transferred by said plate 27, one engaging pin 33 and one engaging hook 38 placed close to each other are engaged, the change-over plate 31 is rotated in a counter-clockwise direction and also said plate 31 is somewhat pulled toward the engaging pin 33 against the controlling spring 40; therefore the other engaging pin 34 and the other engaging hook 39 separated from each other are crossed and moved at different levels, said plate 31 is swingingly changed, and the idle roller 15 is contacted with the reverse roll 17 through the cooperative lever 35; at the same time the pressure of one supporting plate 42 is released by the pressing pin 44 which is on the same shaft as that of said engaging pin 34 and the pinch roll 10 is pressingly contacted with capstan shaft 8 through the spring 45; further the end of the other supporting plate 43 is pressed by the pressing pin 44, the pinch roll II is detached from the capstan shaft 9 against the spring 46, said reel shaft 5 is rotated in a counter clockwise direction and the magnetic tape 2 is wound round the reel 3; and also the magnetic tape 2 is transferred in the left hand direction at a uniform speed by the capstan shaft 8 and pinch roll 10 and then said tape 2 is again reproduced through the magnetic head 12.

Moreover, said magnetic head 12 possesses 4 gaps (not shown on the drawing) contacted respectively with each of the tracks of the magnetic tape 2 that possesses four tracks and two channels; it also reads the recording signal of each channel by the reciprocating of said tape 2.

Figure 12:
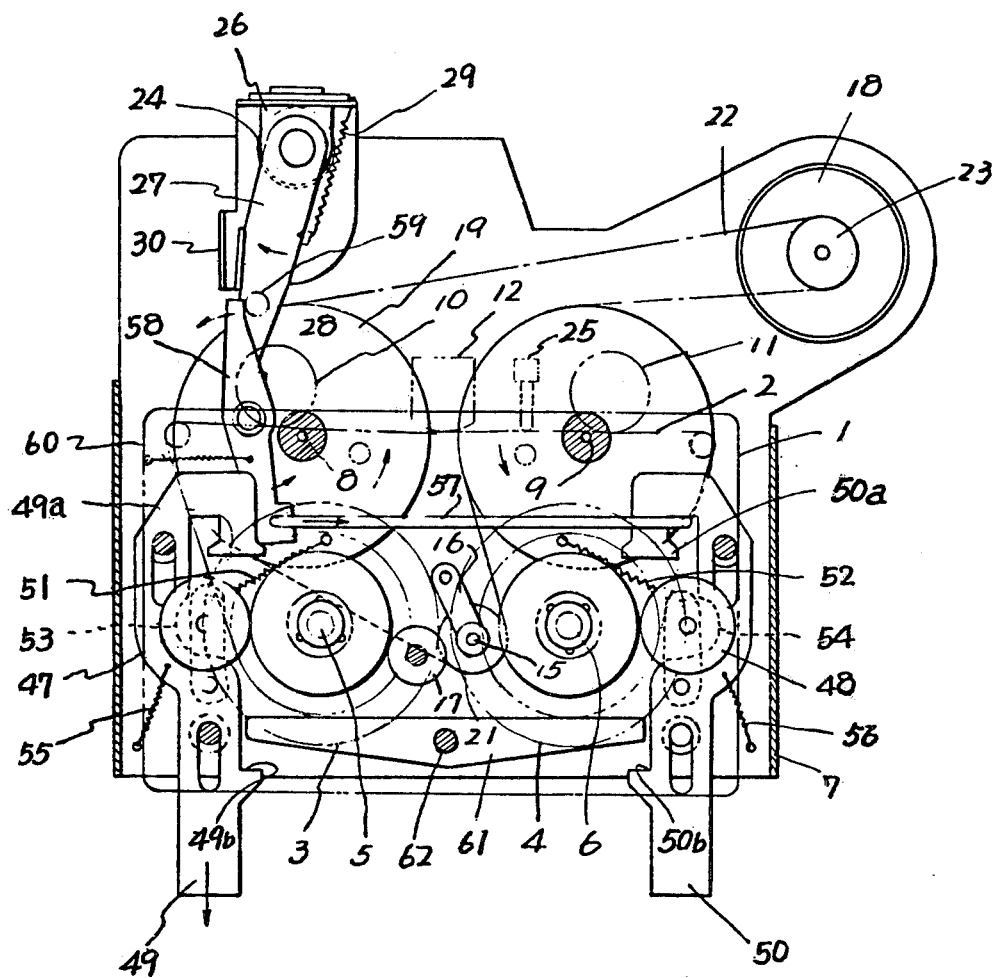

The following embodiment is shown in FIG. II. When the cassette I is accommodated on the chassis and one fast-forwarding lever 49 is pressed and slid against the spring 55 and the fast-forwarding roll 47 is contacted with the fly-wheel 19 and the reel shaft 5 through the spring 51 and also the pinch rolls 10, II are detached from the capstan shafts 8, 9, then said reel shaft 5 is rapidly rotated in a counter clockwise direction, the magnetic tape 2 is rapidly forwarded in the left hand direction and the magnetic tape 2 is rapidly wound round the reel which is contacted with and accommodated in the reel shaft 5. Then, when winding the magnetic tape 2 round said reel 3 is over, the end of said tape 2 is sensed by the sensor 25, the electromagnetic relay 24 is excited, the contact plate is moved down on the surface of the fly-wheel 19 against the spring 29, and the plate 27 is swung by the contact pin 28. And as is shown in FIG. 12, the pin 59 of said plate 27 is contacted with one end of restoring plate 58, said plate 58 is rotated in a counter clockwise direction against the spring 60; at the same the lock arm 57 is slide in the left hand direction, the movement of said fast-forwarding lever 49 is restored through the spring 55 and the fast-forwarding operation of the magnetic tape 2 is released. Also, when the other fast-forwarding lever 50 is operated, the magnetic tape 2 is rapidly transferred in the right hand direction as is mentioned above, said tape 2 is rapidly wound round the reel 4 through the reel shaft 6 and at the same when it is over, said operation is automatically released; thus the magnetic tape 2 is rapidly forwarded in the right and left hand direction appropriately.

Figure 13:
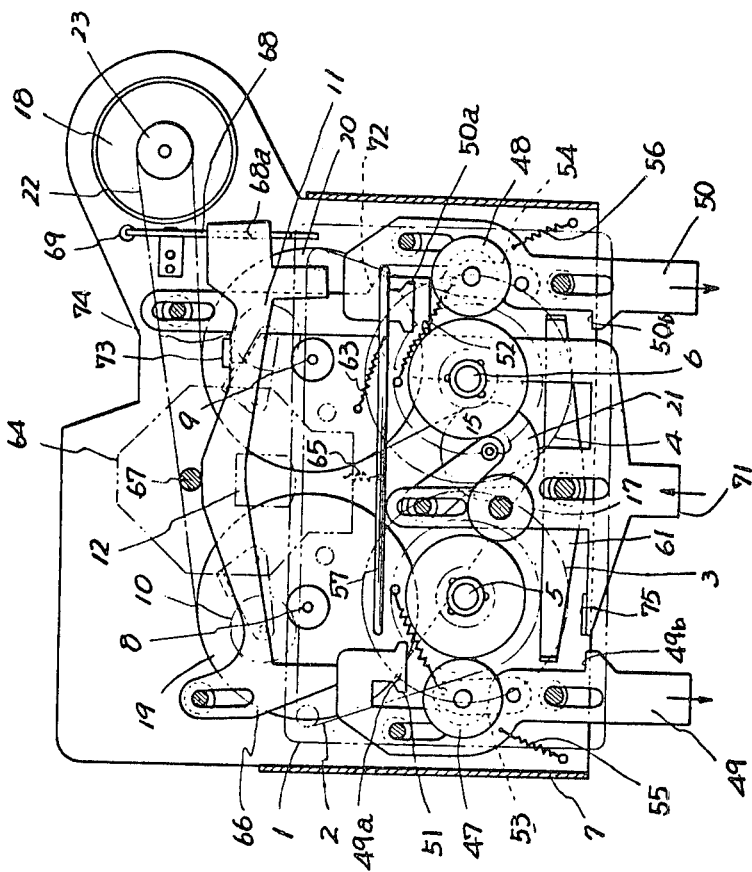
FIG. 13 is a general plan view.
Figure 15:
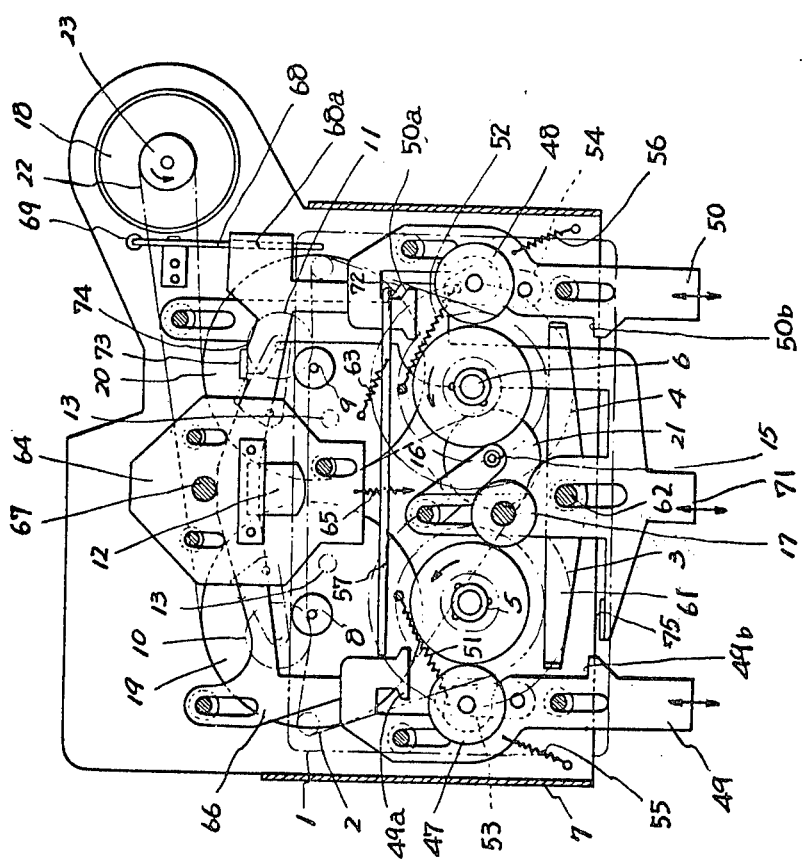
FIG. 15 and FIG. 16 are general plan views illustrating the operation as indicated in FIG. 13.
Figure 16:
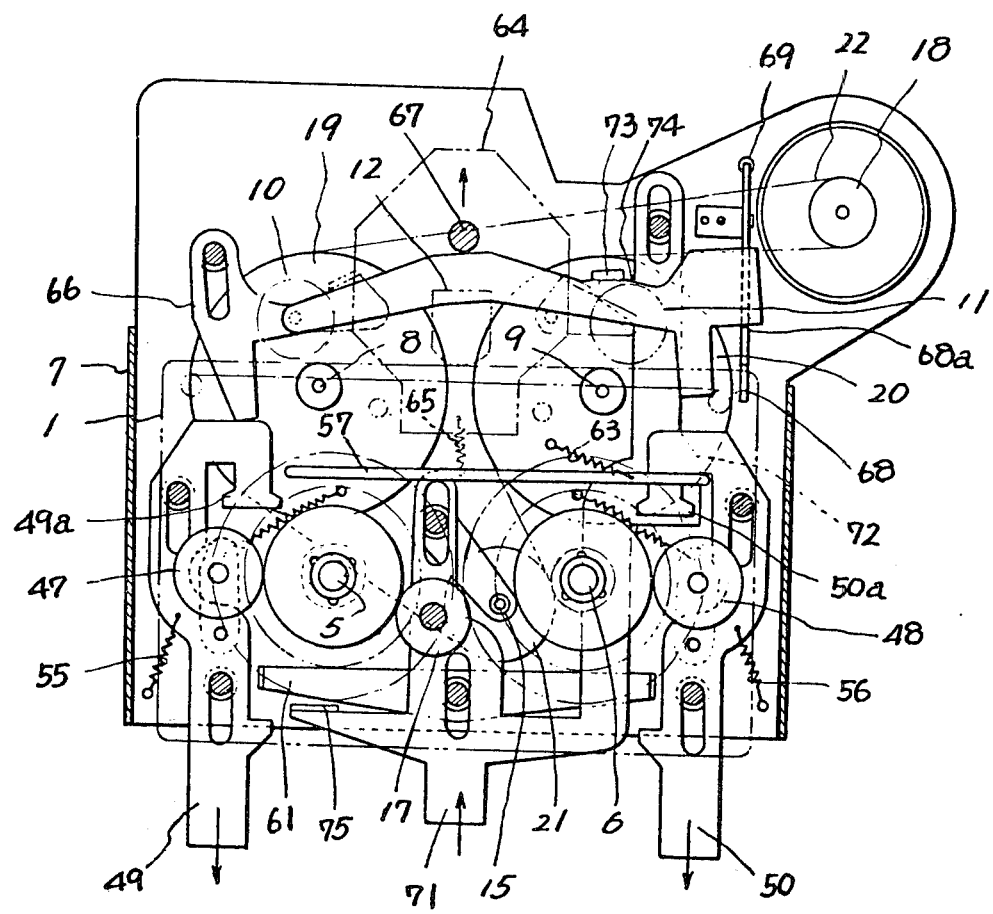

Also the following embodiment is shown in FIG. 13 and FIG. 14. When the cassette I is accommodated in the settled position on the chassis 7, the bottom surface of the cassette I is contacted with the hook plate 68, said hook plate 68 is rotated against the spring 69 and its shoulder 68a is detached from the playing plate 40. At this time, the sliding plate 64 as well as the playing plate 66 is slid toward the cassette I by the spring 65 and each of the pinch rolls 10, 11 and the magnetic head 12 are accommodated in the cassette I. And each of the pinch rolls 10, 11 is contacted with each of the capstan shafts 8, 9 alternately and also the idle roller 15 is contacted with and detached from the reel shaft 6 or the reversing roll 17; then the magnetic tape 2 is transferred in the positive and reverse direction at a uniform speed, and reciprocated and reproduced. Also when each of the fast-forwarding levers 49, 50 is slid into engagement with the lock arm 57 alternately and kept in that condition; each of the fast-forwarding rolls 47, 48 is contacted with and detached from each of the fly wheel 19, 20 and each of the reel shafts 5, 6 alternately and also the movement of the sliding plate 64 is somewhat restored through the playing plate 66 by each of the levers 49, 50; each of the pinch rolls 10, 11 and the magnetic head 12 are somewhat detached from the magnetic tape 2 and said tape 2 is rapidly forwarded in the right and left hand direction. Furthermore, at the time when the playing of said cassette I is over and the stopping lever 71 is slid as is shown in FIGS. 15 to 17, then the lock arm 57 is moved against the spring 63 by the first shoulder of said lever 71 as in shown in FIG. 15, and the engaging operation of the fast-forwarding levers 49, 50 that are engaged by said arm 57 is released. And when said lever 71 is further slid, the tongue 73 of the playing plate 66 is pressed by the second shoulder of said lever 71 as is shown in FIG. 16, the movement of plate 66 is restored to the position of the engaging shoulder 68a of the hock plate 68 and also the movement of the sliding plate 64 is restored; and then each of the pinch rolls 10, 11 and the magnetic head 12 are detached from the cassette I. Then when said lever 71 is further slid, the ejecting arm 70 is pressed by the third shoulder of said lever 71 as is shown in FIG. 17, the cassette I is raised above the chassis 7 through said arm 70 and from this settled position the cassette is ejected.

Figure 18:
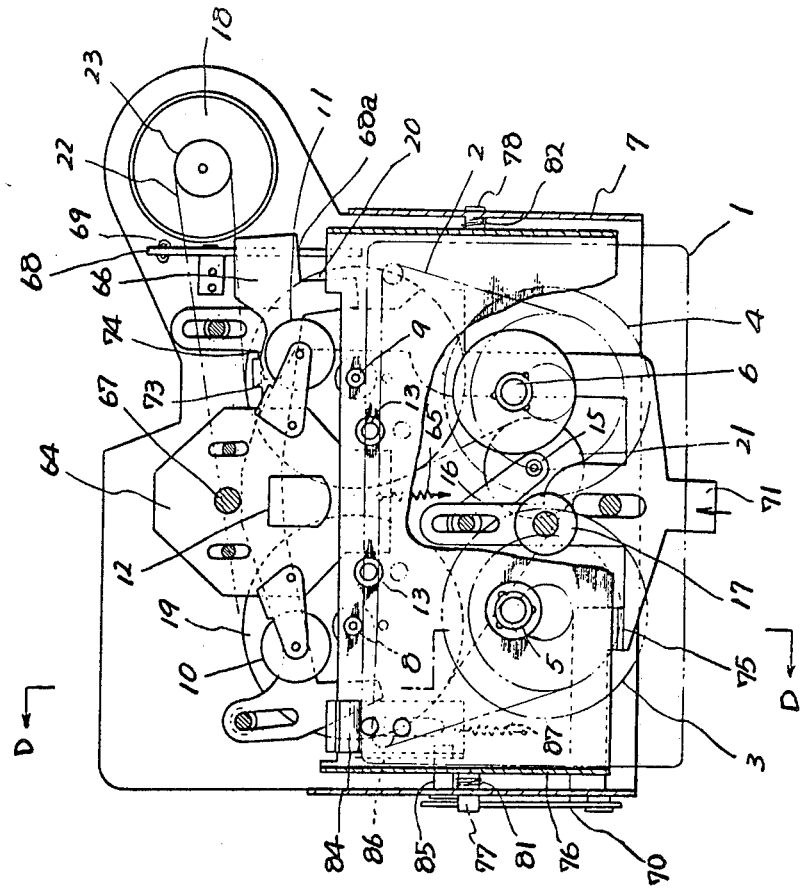
FIG. 18 is a general plan view.
Figure 20:
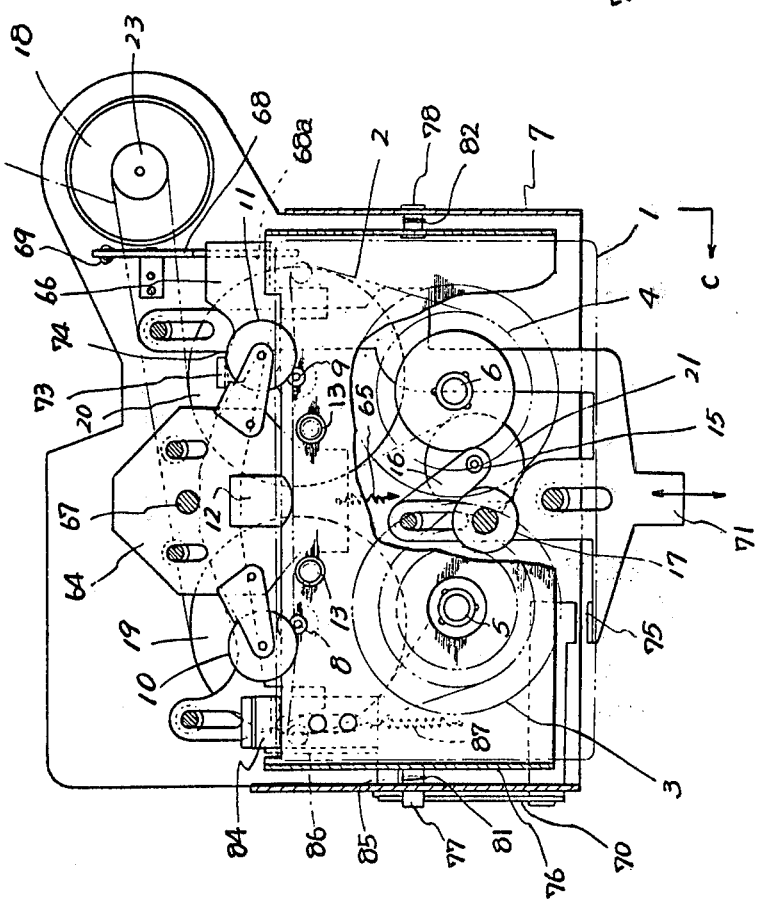
FIG. 20 is a general plan view illustrating the operation as indicated in FIG. 18.
Figure 19:
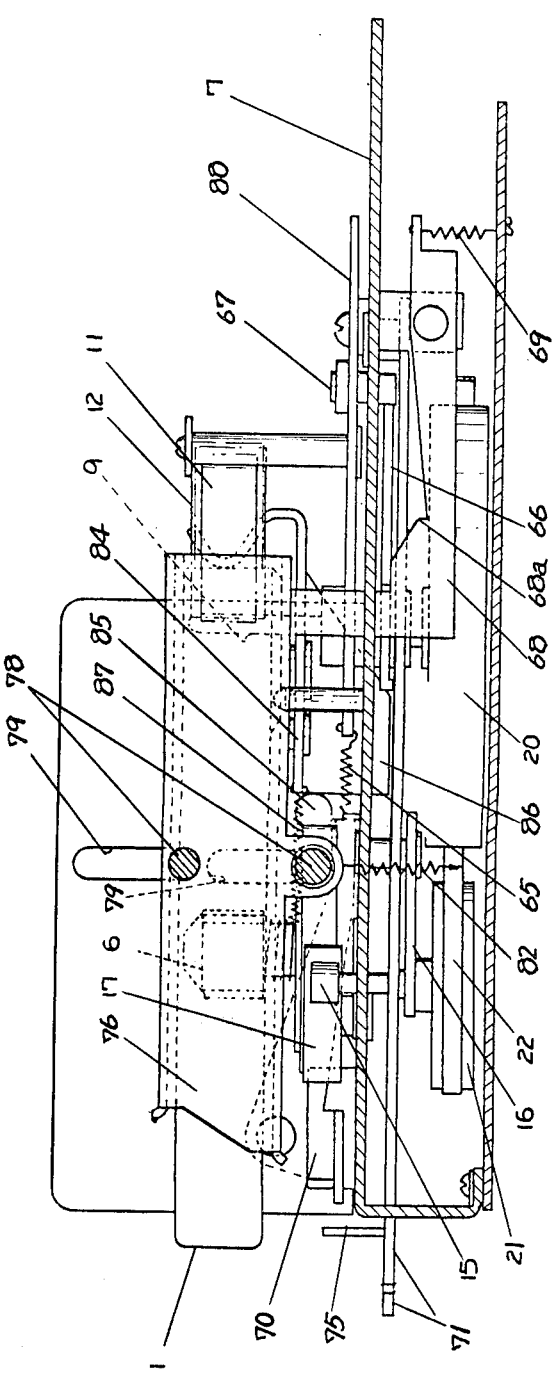
FIG. 19 is a sectional view taken on line C — C in FIG. 18.
Figure 21:
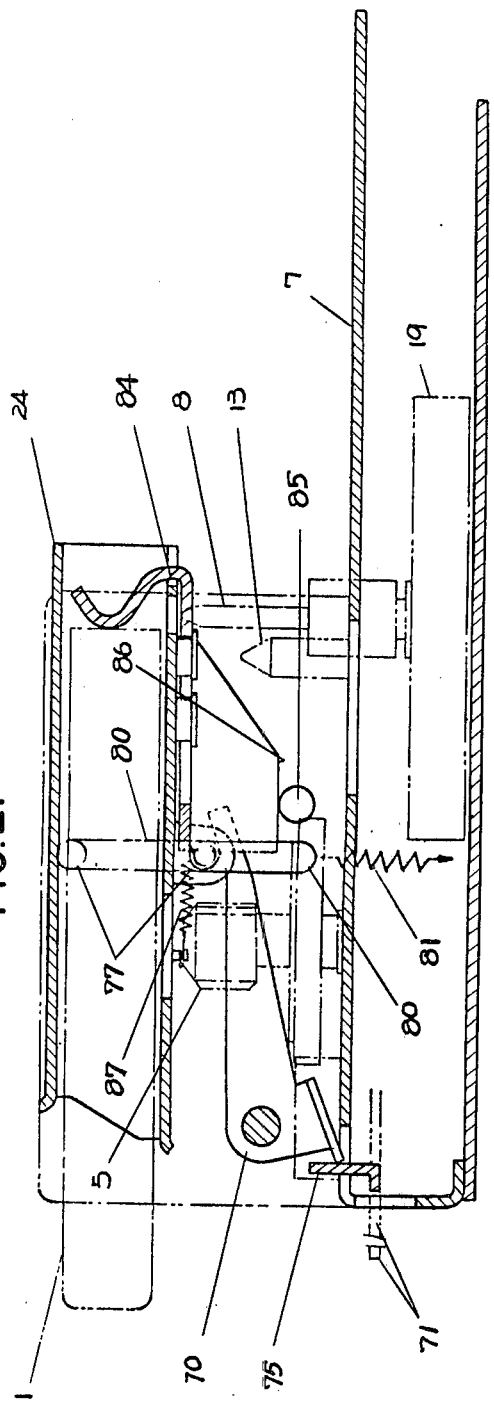
FIG. 21 is a sectional view taken on line D — D in FIG. 20.

The following embodiment is shown in FIG. 18 and FIG. 19. When said cassette I is accommodated in the accommodating case 76, the front of the cassette I contacts with the ejection-controlling plate 84 and presses said plate 84 against the spring 87; and said plate 84 is detached from the pin 85 and the accommodating case 76 is moved down through each of the springs 81, 82. At this time the hook plate 68 is pressed by the bottom of the accommodating case 76, said hook plate 68 is rotated against the spring 69 and its shoulder 68a is detached from the playing plate 66. And the sliding plate 64 as well as the playing plate 66 is slid toward the cassette I by the spring 65, each of the pinch rolls 10, 11 and the magnetic head 12 are accommodated in the cassette I and each of the pinch rolls 10, 11 is contacted with each of the capstan shafts 8, 9 alternately; and also the idle roller 15 is contacted with and detached from the reel shaft 6 or the reverse roll 17, the magnetic tape 2 is transferred in the positive or reverse direction at a uniform speed and reciprocated and reproduced. Also at the time when the playing of said cassette I is over and the sliding of the stopping lever 71 is operated as is shown in FIG. 20 and FIG. 21, the tongue 73 of the playing plate 66 is pressed by the second shoulder 74 of said lever 71 and said plate 66 is restored and moved to the engaging position of the shoulder 68a of the hook plate 68; at the same time the movement of the sliding plate 64 is restored and each of the pinch rolls 10, 11 and the magnetic head 12 are detached from the cassette I. Then the ejecting arm 70 is pressed by the third shoulder 75 of said lever 71, said accommodating case 76 is raised against the spring 82 by said arm 70, the movement of the ejection-controlling plate 84 is restored through the sping 87, said plate 84 is engaged with the pin 85 and kept there; and also the cassette I is ejected outside the case 76 by said plate 84.

According to the present invention as is shown in the embodiments mentioned above, the change of forwarding said magnetic tape in the positive or reverse direction is operated correctly and smoothly. The structure of the present invention is simple and very compact. As said changing operation uses the rotational power of the capstan shaft, it is very powerfully performed in an instant; and also the electromagnetic relay is made small in form; therefore the present invention is also very practical and economical. And also as each operating plate is closely combined with the chassis at a different level, the constructing space of the chassis is effectively used; therefore the present invention can be small in structure and light in weight. Further, as the releasing of said fast-forwarding operation is performed by the surplus energy which drives the capstan shaft, the present invention is very economical.

In the present invention, on one hand the repeating operation of the magnetic tape cooperating with the playing mechanism can be easily performed; on the other hand the releasing of forwarding of said magnetic tape at either a uniform speed or at a rapid speed, as well as the ejecting of the cassette can be performed automatically step by step, and in oder, by the operation of the stopping lever; therby each operation can be simplified and wrong movement is prevented. Further, the cassette is inserted in the accommodating case where it can be located in the playing condition; said cassette is also taken out of the cassette by pressing and sliding the stopping lever; thereby the cassette can be placed in and taken out by simple movements. Therefore the present invention is very convenient.

The subject invention in its broader aspects is not limited only to the specific embodiment shown and described but departures may be made therefrom within the scope of the accompanying claims without departing from the principles of the invention and without sacrificing its chief advantages.

What is claimed is:

1. A tape cassette recorder comprising a pair of reel shafts which accommodate both winding and rewinding shafts contained within a tape cassette, a pair of capstan shafts to be rotated in opposite directions for transferring magnetic tape in said cassette alternatively in opposite directions, each of said capstan shafts including a flywheel and at least one of said flywheels being provided with a projecting pin, an idle roller including mounting means for shifting the idle roller between two positions and for alternatively rotating each of said reel shafts in opposite directions, a driving motor including belt means for rotating said flywheels, capstans and idle roller, a sensor which senses the end of a magnetic tape and electromagnetic relay including a contact plate which is shifted by said electromagnetic relay in response to said sensor to a position to be engaged by said pin for movement by said pin to another position, and means connecting said contact plate with said mounting means for the idle roller for shifting the idle roller alternatively between said two positions in response to movement of said contact plate to said another position.

2. A tape recorder as claimed in claim 1 wherein said means connecting the contact plate with the mounting means for the idle roller includes a change-over plate rotatably supported on a chassis of the tape recorder and includes a pair of engaging pins at each end; and a link plate is pivotally connected with said contact plate at its one end and at the other end includes a pair of engaging hooks to be inserted in and contacted with said contact pins; and thus by the operation of said contact plate, said change-over plate is swung by each reciprocating movement of said link plate and the change of the idle roller to each reel shaft is alternately operated.

3. A tape recorder as claimed in claim 1 wherein a yoke of said electromagnetic relay is extended to the position where said contact plate is moved; thereby when the contact plate is moved by the contact pin of said fly-wheel, the contact of said contact plate with said yoke is kept; and thereby each movement of said contact plate is made at each movement of said electromagnetic relay with no regard to the lasting time of the relay's movement.

4. A tape recorder as claimed in claim 1 wherein said tape recorder further comprising a pair of pinch rolls, and supporting plate which are cooperated with said change-over plate and alternately contacts and detaches said pinch rolls with and from each of said capstan shafts.

5. A tape recorder as claimed n claim 1 further comprising a pair of fast-forwarding rolls which are appropriately contacted both with the fly-wheels pivoted on each said capstan shaft and with each reel shaft so as to convey the rotation power of each fly-wheel to each reel shaft; a pair of fast-forwarding levers which contact and detach fast-forwarding roll with and from each fly-wheel and each reel shaft that correspond to each roll; a lock arm which holds each fast-forwarding lever in an operating condition; a restoring plate which is cooperated with said contact plate so as to release the holding operation of the fast-forwarding lever held by the lock arm.

6. A tape recorder as claimed in claim 5 further comprising supporting plates which include both a magnetic head contacted with said magnetic tape accommodated in a cassette together with said winding and rewinding reels, and pinch rolls touched with said capstan shafts, and also which are slidably mounted on the chassis wherein is accommodated a casette possessing each of said reels and said magnetic tape; a playing plate which controls the sliding movement of said supporting plates so as to contact and detach the magnetic head and the pinch rolls with and from the cassette; a hook plate which is cooperated with the contact and detachment of said cassette so as to be engaged with and separated from the playing plate; an ejecting arm which detaches said cassette from its settled position on the chassis; a stopping lever which performs in succession the releasing movement of the fast-forwarding lever whose operation is held by said lock arm and the restoring movement of the supporting plate by means of said playing plate the ejecting movement of the cassette by means of said ejecting arm.

7. A tape recorder as claimed in claim 1 further comprising an accommodating case which accommodates a cassette wherein is contained said magnetic tape and also which is slidably mounted on the chassis so as to contact and detach said cassette with and from the playing position on the chassis; springs which let said accomodating case approach to the cassette-playing position on the chassis; an ejecting arm which acting against said springs detaches the accomodating case from the cassette-playing position on the chassis; a stopping lever which detaches from the cassette both the magnetic head contacted with the magnetic tape of said cassette and the pinch rolls touched with the capstan shafts, and also which operates said ejecting arm; an ejection controlling plate which is cooperated with the cassette accommodated in said accommodating case so as to shift said case through said springs to the cassette-playing position on the chassis, and also which detaches the cassette from the accommodating case when the movement of the accommodating case is restored through the ejecting arm.

* * * * *